Sept. 13, 1966            A. B. STILES            3,272,868
INTERMITTENT WATER VAPOR ADDITION
DURING FORMALDEHYDE SYNTHESIS
Filed Oct. 2, 1964
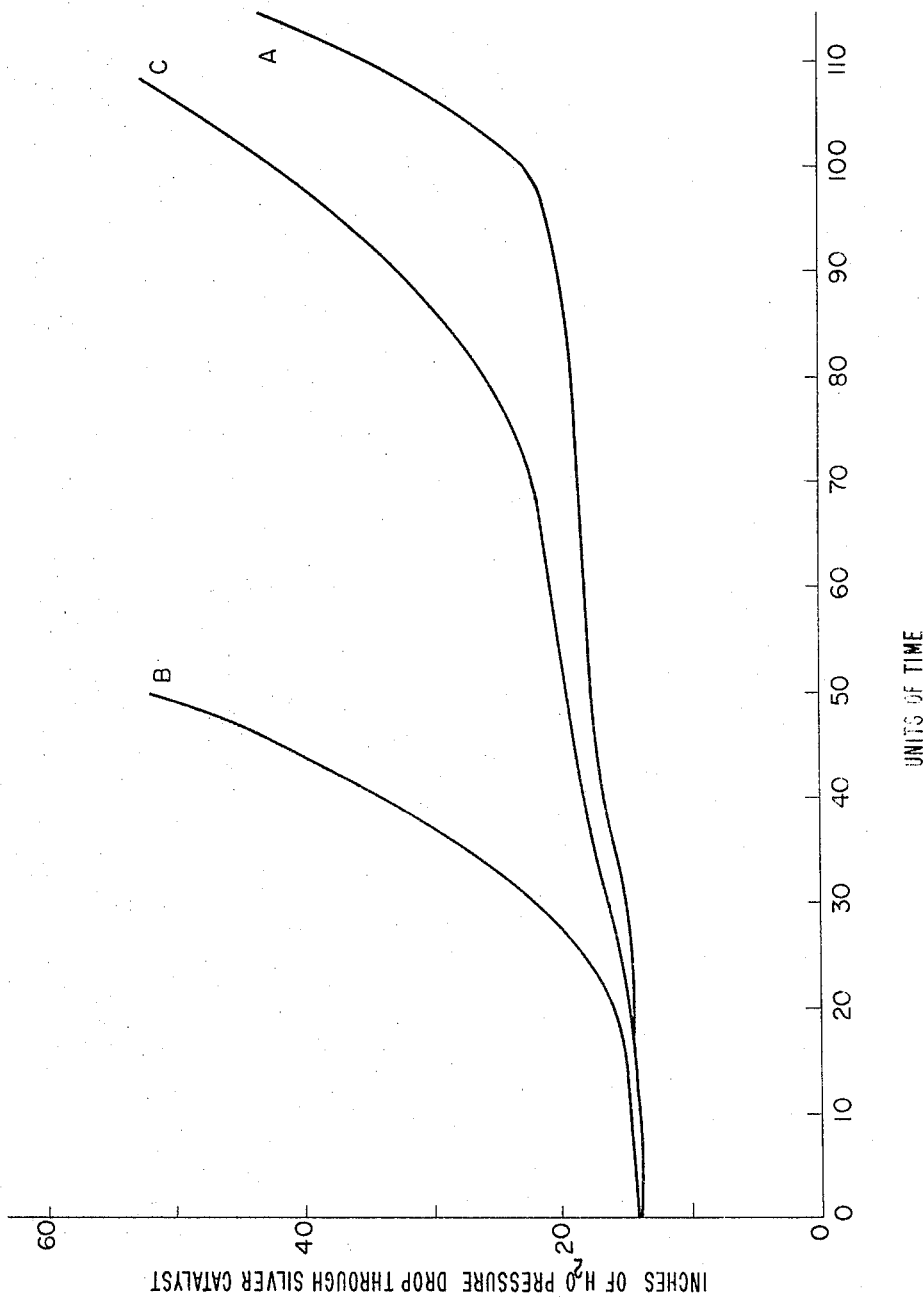
INVENTOR
ALVIN B. STILES
BY *Albert B. Griggs*
ATTORNEY 3,272,868
INTERMITTENT WATER VAPOR ADDITION
DURING FORMALDEHYDE SYNTHESIS
Alvin B. Stiles, Wilmington, Del., assignor to E. I. du
Pont de Nemours and Company, Wilmington, Del., a
corporation of Delaware
Filed Oct. 2, 1964, Ser. No. 403,689
5 Claims. (Cl. 260—603)

This application is a continuation-in-part of my copending application Serial No. 161,220, filed December 21, 1961, now abandoned.

This invention relates to an oxidative dehydrogenation of methanol to formaldehyde using a catalyst and is more particularly directed to such processes in which formaldehyde of high concentration in aqueous solution is produced by intermittently raising and lowering the humidity of the methanol vapor to the catalyst.

In the drawing the invention is illustrated by curves showing the comparatively long time required for a great increase of pressure drop using processes of the invention.

In the oxidative dehydrogenation of methanol using a catalyst it has been found necessary to add water vapor with the methanol. If this is not done the metal catalyst such as silver or copper becomes deactivated and fouled by deposition of carbon, by dendritic silver or copper formation on the catalyst, and by fouling with other materials not well understood. This causes increase in resistance to the flow of gases through the catalyst. This is illustrated by Curve B in the drawing.

Passing rather large amounts of water vapor together with the methanol has in the past minimized such fouling and deactivation of the catalyst and has lowered the explosibility range but at the same time the formaldehyde produced contains excesses of unwanted water. Furthermore, the added water absorbs much of the heat of reaction thereby decreasing conversion by decreasing the formaldehyde production via the dehydrogenation phase of the reaction. Thus, formaldehyde is synthesized by two routes over a catalyst in the oxidative dehydrogenation process:

(1) 
$CH_3OH + O_2 \rightarrow HCHO + H_2O$ (exothermal)

(2) 
$CH_3OH \rightarrow HCHO + H_2$ (endothermal)

It will be noted that reaction 2 does not produce water so it is desirable to enhance this phase of the reaction by minimizing water present in the reaction environment. The formaldehyde must be removed from the excess of water as by distillation. Processes using relatively large amounts of water are illustrated in Curve A of the drawing.

I have found that if the humidity of methanol going to the catalyst is ordinarily low and is only intermittently raised the fouling and deactivation is more efficiently minimized than when high humidity is maintained continuously. Such an operation according to the invention is illustrated with Curve C in the drawing where a very slow build-up of back pressure is obtained without the attendant disadvantages of adding large quantities of water.

According to the invention, processes for the oxidative dehydrogenation of methanol are conducted in conventional fashion. Methanol vapor is passed together with oxygen over a catalyst. The proportions of methanol vapor and oxygen as air are well understood and there need be no deviation from customary practices. In general, the amount of methanol in the feed can vary from about 35 volume percent to about 50 volume percent based on the volume of the air-methanol mixture, which is equivalent to about 50 volume percent to 100 volume percent of methanol based on air. The lower limit is determined by the explosive range of air-methanol mixtures. The upper limit is determined by the practical consideration that at methanol concentrations above this limit there is insufficient air in the feed to promote adequate oxidation of the methanol fed with the consequence that excessive unreacted methanol is present in the formaldehyde product. It is preferred to operate at a methanol feed concentration in the range of about 65 volume percent to about 75 volume percent based on the volume of air, and ordinarily the process will be operated with a feed containing about 70 volume percent methanol.

The catalyst can be pure silver in the form of wire, woven gauze or screen, cylinders, irregular shapes, or in any other shape customary in the art. The silver can be alloyed with other metals and can be promoted in accordance with customary practices. While silver is a preferred catalyst any other suitable catalyst can be used and there can be employed, for example, pure copper or copper alloys. These similarly can be in any customary shape and can be promoted in the usual way.

According to the present invention conventional processes as just described are modified by intermittently raising and lowering the water content of the methanol vapors. In ordinary operation, with a feed mixture containing about 70 volume percent of methanol based on air, the amount of water in the mixture fed to the catalyst will amount to about 16 volume percent. When referring to volume percent of water vapor herein it will be understood that this is always intended to refer to the content of water vapor in the water vapor-methanol vapor-air mixture fed to the catalyst and is expressed as the volume percent of water vapor in air. It is preferable that the water vapor content be slightly lower, say 14% or below, while more specifically it is ordinarily desired to operate within a percent or so of 14 volume percent.

Intermittently the water vapor content of the feed gases is increased to 20 volume percent or higher. The water vapor can go up to 30% or even higher but as amounts approaching 30% are used the product becomes entirely too dilute and the reaction will slow down until it becomes impractical or even inoperative. Thus 30% represents a practical operating limit though somewhat more could be tolerated for brief periods.

When operating as described with a feed mixture containing about 70 volume percent methanol based on air, the water content of the methanol fed to the catalyst will be no more than about 13%, and preferably about 8 to 12% by weight of water based on the weight of methanol during normal operation. When the water vapor content of the feed is raised, the water content of the methanol will be at least about 16% by weight, and will preferably be no greater than about 20% by weight, based on the weight of methanol. Of course, one may operate the process with a feed mixture containing any amount of methanol within the range 50 to 100 volume percent based on the volume of air as described above, and still obtain the benefits of the invention, so long as the weight ratio of water to methanol is maintained at no more than about 13% during normal operation, and is intermittently raised to at least about 16% during the remainder of the time.

The use of increased amounts of water vapor is intermittent and the high levels of water vapor can be supplied for, say 0.5 to 20% of the time of operation. The increase can be used once in each 24 hours or can be used at more frequent intervals for shorter periods to reach a total time as indicated. It is more specifically preferred to use the high humidities during about 2 to 4% of the total time of operation. In actual practice, thus, high levels can be used for, say, 30 to 60 minutes out of each 24 hours though additions for 15 to 30 minutes could be made every 12 hours. Any similar convenient time schedule can be followed.

The water vapor content of the methanol vapor feed to the catalyst can be introduced at the desired levels in any convenient manner. Thus the air to be mixed with methanol vapor can be pre-humidified to the desired levels and then mixed with methanol vapor. This is a practical and preferred practice. If the methanol used contains water this becomes a part of the water vapor in the feed stream and, of course, water could be added to the methanol to give the desired or part of the desired water content.

In order that the invention may be better understood reference should be had to the following illustrative example:

*Example 1, State 1*

5,859 parts by weight of dry air per hour was humidified by passing it continuously through a packed column down which water, maintained at 63° C., was cascading. The air thus was effectively humidified to a dew point of about 63° C. and had adsorbed 860 parts by weight of water per hour. The humidified air was then uniformly mixed with methanol vapor which was added at a rate of 4641 parts by weight per hour. The air-methanol-water vapor mixture was heated to 105° C., then was fed to an adiabatic reactor newly charged with metallic silver catalyst. The reaction temperature was 600° to 650° C. which is a range in which formaldehyde is synthesized from methanol by endothermal catalytic dehydrogenation as well as by exothermal oxidative dehydrogenation. The reaction was continued for an extended period of time. The products of the reaction were mixed with humidified air and processed according to the procedure described in U.S. 2,519,788—Payne in a second converter containing a molybdenum oxide type catalyst. Finally the effluent from the second reactor was scrubbed with 400 parts by weight of water per hour which is the minimum possible while efficiently scrubbing the formaldehyde from the effluent gases. The formaldehyde concentration in the product was 51.6%. A plot of the pressure drop increase through the silver catalyst with time is given as Curve A of FIGURE 1.

*Example 1, State 2*

The same conditions applying in Example 1, State 1, were applied in State 2, with the exception that the air stream initially added to the reactant gases was humidified at 53° C. instead of at 63° C. (contained 485 parts by weight of water instead of 860 parts by weight) thus decreasing the water which would enter the silver catalyst reactor and consequently decreasing the quantity that would be present in the scrubbed product. In addition, a new charge of silver catalyst was employed. The formaldehyde content of the formaldehyde solution of State 2 was 58.5%. A plot of the pressure drop change through the silver catalyst with time is given as Curve B of FIGURE 1.

*Example 1, State 3*

Now, operating according to the invention, the same conditions applying in State 2 also applied in this case with the exception that the air stream initially added to the reactant gases was humidified at 53° C. for 23 hours and at 63° C. for one hour each 24-hour period. Also in this state, a new charge of silver catalyst was employed. The formaldehyde content of the average product of the formaldehyde solution of State 3 was 58.1%. A plot of the pressure drop change through the silver catalyst with time is given as Curve C of FIGURE 1. It can be seen that the pressure drop has remained low as in State 1 but the formaldehyde content of the formaldehyde solution was desirably high. Visual examination of the silver catalyst charges that were used in each state showed that the used catalysts after States 1 and 3 were clean and new looking whereas that from State 2 was black and disintegrated.

I claim:

1. In the process of oxidatively dehydrogenating methanol to make formaldehyde by passing a mixture of methanol vapor, water vapor, and air over a catalyst, wherein the amount of methanol vapor in the feed is in the range of about 50 to 100 volume percent based on the volume of air, the improvement which comprises operating normally at a feed humidity of about 8 to 12% by weight of water based on methanol, and intermittently raising and lowering the water content of the feed so as to operate at a feed humidity of about 16–20% by weight of water based on methanol during a total of about 0.5% to 20% of the time.

2. In the process of oxidatively dehydrogenating methanol to make formaldehyde by passing a mixture of methanol vapor, water vapor, and air over a catalyst, wherein the amount of methanol vapor in the feed is in the range of about 50 to 100 volume percent based on the volume of air, the improvement which comprises operating normally at a feed humidity of about 8 to 12% by weight of water based on methanol, and intermittently raising and lowering the water content of the feed so as to operate at a feed humidity of about 16 to 20% by weight of water based on the methanol during a total of about 2 to 4% of the time.

3. The process of claim 2 wherein the amount of methanol vapor in the feed is in the range of about 65 to 75% by volume based on the volume of the air.

4. The process of claim 1 wherein the catalyst is selected from the group consisting of silver, silver alloys, copper, and copper alloys.

5. In the process of oxidatively dehydrogenating methanol to make formaldehyde by passing a mixture of methanol vapor, water vapor and air over a catalyst wherein the amount of methanol vapor in the feed is about 70 volume percent based on the volume of air, the improvement which comprises operating normally at a feed humidity of about 10.5% by weight of water based on methanol and raising the water content of the feed to a humidity of about 18.5% by weight of water based on the methanol for about 1 hour out of each 24 hours of operation.

References Cited by the Examiner

UNITED STATES PATENTS

| | | | |
|---|---|---|---|
| 2,465,498 | 4/1949 | Uhl et al. | 260—603 |
| 2,519,788 | 8/1950 | Payne | 260—603 |
| 3,174,911 | 3/1965 | Webb et al. | 260—603 |

OTHER REFERENCES

Walker: Formaldehyde, 3rd ed., 1964, p. 11.

LORRAINE A. WEINBERGER, *Primary Examiner.*

DANIEL D. HORWITZ, *Primary Examiner.*

R. H. LILES, *Assistant Examiner.*